S. E. CONDON.
STUFFING BOX.
APPLICATION FILED JUNE 27, 1908.
911,807.
Patented Feb. 9, 1909.
2 SHEETS—SHEET 1.
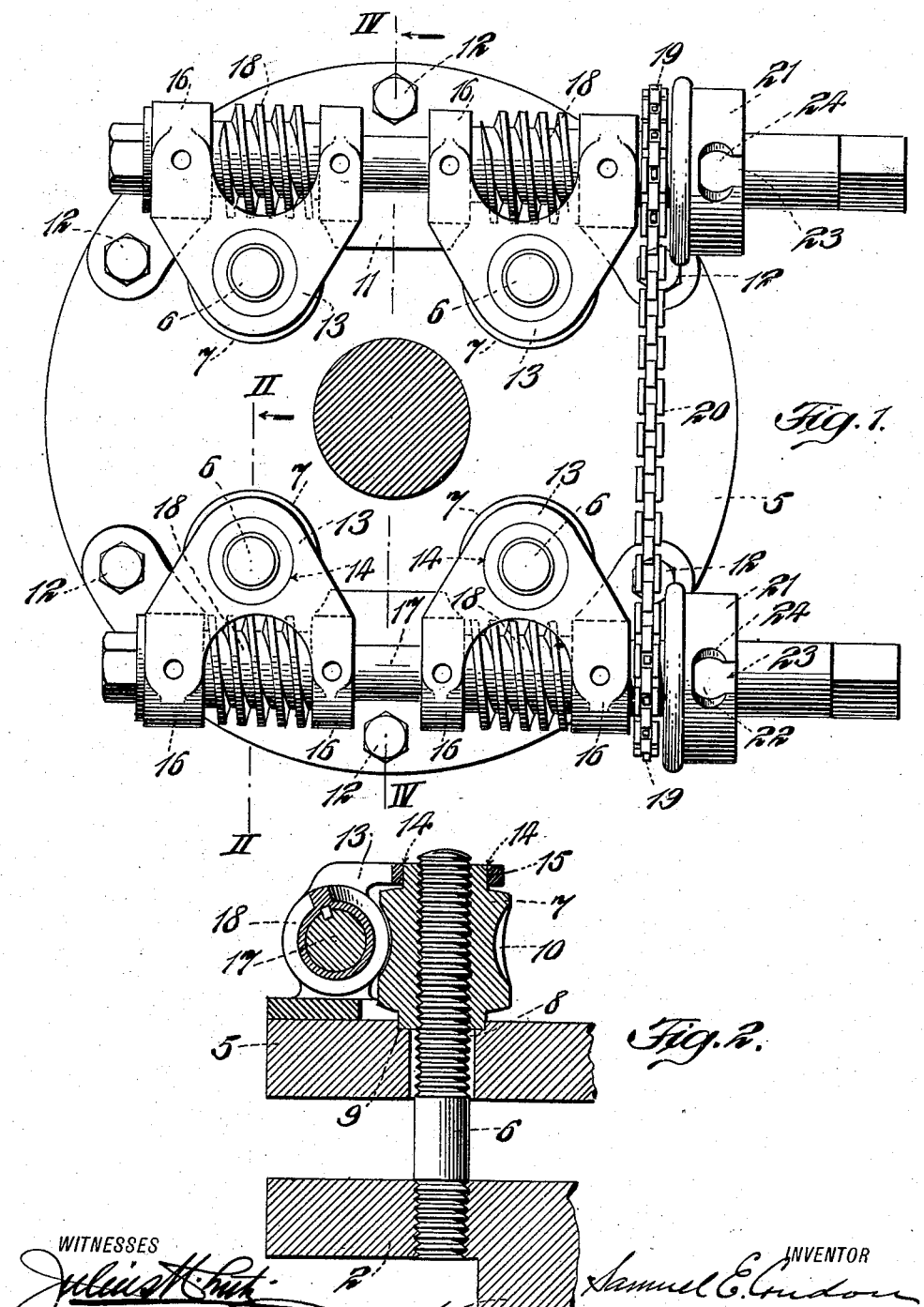

S. E. CONDON.
STUFFING BOX.
APPLICATION FILED JUNE 27, 1908.
911,807.
Patented Feb. 9, 1909.
2 SHEETS—SHEET 2.
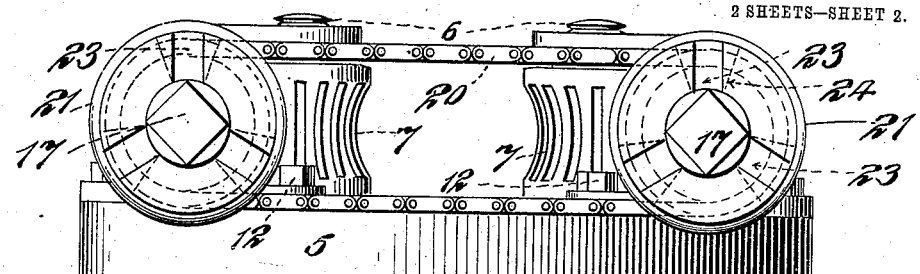
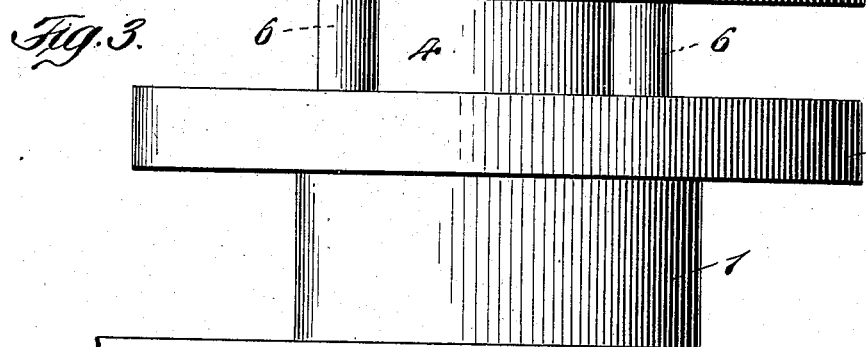
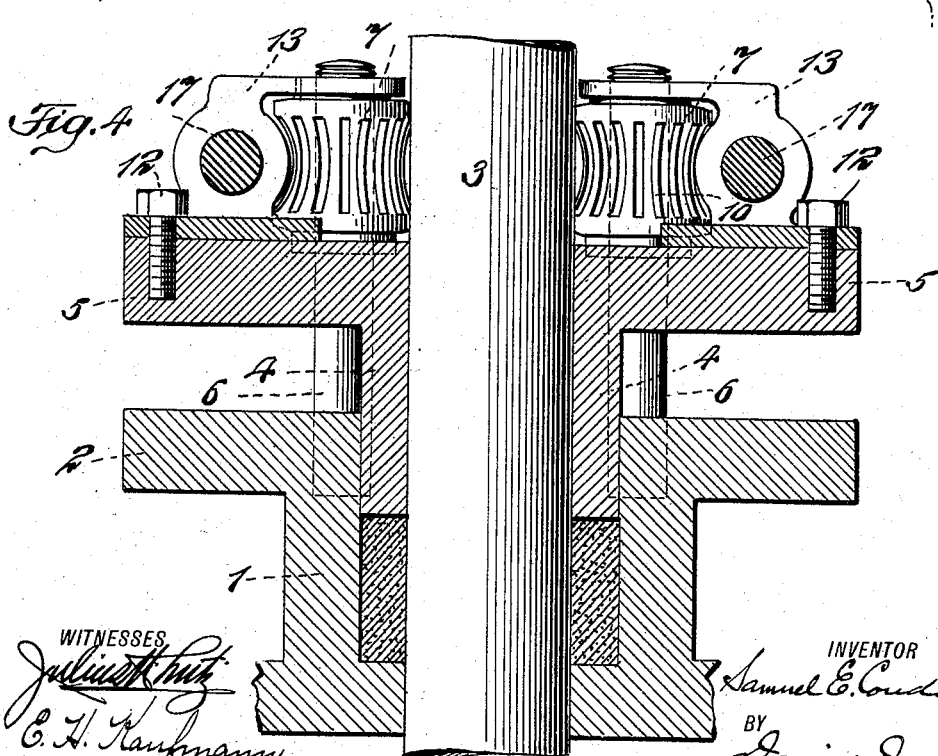
WITNESSES
INVENTOR
Samuel E. Condon
BY
his ATTORNEYS

UNITED STATES PATENT OFFICE.

SAMUEL E. CONDON, OF NEW YORK, N. Y.

STUFFING-BOX.

No. 911,807.  Specification of Letters Patent.  Patented Feb. 9, 1909.

Application filed June 27, 1908. Serial No. 440,728.

*To all whom it may concern:*

Be it known that I, SAMUEL E. CONDON, a citizen of the United States, residing in the borough of Brooklyn, county of Kings, city and State of New York, have invented certain new and useful Improvements in Stuffing-Boxes, of which the following is a specification, reference being had therein to the accompanying drawings, in which—

Figure 1 is a plan view of my improved stuffing box; Fig. 2 a vertical sectional view on the line II—II of Fig. 1; Fig. 3 a side elevation of the box; and Fig. 4 a vertical sectional view on the line IV—IV of Fig. 1.

In stuffing boxes of large sizes the packing gland is usually adjusted by means of nuts working on a plurality of stud bolts, said bolts extending through the flange of the gland and the nuts bearing against said flange. In this form of construction the nuts will turn on the bolts independently of each other with the result that the gland is forced down first at one point and then at another as each nut is turned on its bolt. The result of this is that the packing gland is tilted first in one direction and then in another. When the gland has been forced down on the packing and the packing is sufficiently compressed, great care must be taken to have the gland properly aline with the piston or piston rod working therethrough. This is necessary in order that the pressure on the packing shall be uniform around the piston and that the gland shall not contact with the piston. There are many objections to this construction.

In large pumps it is frequently necessary to stop the pump for a considerable time to permit of the adjustment of the packing gland, it being practically impossible to effect this adjustment during the working of the pump. It is obvious that considerable loss is sustained in the stopping of a large pump or pumping engine in addition to the inconvenience caused by the actual stoppage of the pump.

By means of my invention the packing gland is moved against the packing by a simultaneous operation of all of the securing nuts, and the gland is maintained in perfect alinement with the piston or piston rod during its adjustment. By this means I avoid the greatest objection to the old form of stuffing box.

It is also an object of this invention to provide means whereby the adjustment of the gland may take place while the pump is in operation, this feature of the invention being particularly applicable to oscillating cylinder pumps, as will be more fully hereinafter set forth.

Referring to the various parts by numerals, 1 designates the stuffing box of a cylinder; and 2 the usual flange formed thereon. The piston 3 passes through the stuffing box and the gland 4 fits around the piston and enters the stuffing box in the usual way and as shown clearly in Fig. 4. The gland is formed with the usual flange 5 at its outer end through which the stud bolts 6 extend, the inner ends of these bolts being rigidly secured in the flange 2 of the stuffing box. Four of these bolts are shown in the drawings, but it is to be understood that I may employ any number of such bolts. These bolts extend loosely through the flange of the gland, as shown clearly in Fig. 2.

Mounted on the outer end of each of the stud bolts is a nut 7. Each of these nuts is provided with a cylindrical reduced portion 8 at its inner end which fits a corresponding recess 9 in the outer surface of the flange 5 of the gland, as shown clearly in Fig. 2. Externally, these nuts are each formed with a worm gear 10, whereby said nuts may be turned by means of the worms as hereinafter described.

Secured to the gland is a pair of frames 11, each frame being secured to the gland by means of bolts 12, and each being formed with two inwardly extending arms 13, said arms being provided with apertures 14 to receive the reduced cylindrical end portions 15 of the nuts 10. The arms 13 form rigid bearings and supports for the outer ends of the nuts.

The frames 11 are each formed with bearings 16 for a horizontal worm shaft 17, said shaft being formed with two worms 18 which are arranged to engage the worm nuts 10 on two adjoining bolts 6, as shown clearly in Fig. 1. Each worm shaft is provided with a sprocket wheel 19, said wheels being connected together by means of a sprocket chain 20, whereby when one worm shaft is turned the other shaft will be simultaneously and synchronously operated, the wheels being so formed that the nuts will be simultaneously screwed inward on the bolts or unscrewed therefrom, depending upon the direction of rotation of the worm shaft.

It is manifest from the foregoing that by means of my device the packing gland will be moved into the stuffing box in direct alinement with the piston or piston rod working through the stuffing box and that, therefore, an even pressure will be exerted on the packing at all times and that there will be no danger of the gland tilting or canting during the adjustment operation and thereby endangering the piston and piston rod working therethrough.

While I have shown the worm shafts connected by means of sprocket wheels and chain, it will, of course, be understood that they may be connected in any other suitable manner to secure their simultaneous and synchronous rotation.

To permit of the adjustment of the gland when it is attached to an oscillating cylinder pump, without stopping the operation of the pump, I provide each shaft with a disk 21 which is rigidly secured to said shaft, preferably near the sprocket wheel carried thereby. Each disk is formed with substantially radial sockets 22, each socket tapering inwardly as shown clearly in dotted lines in Fig. 1. These sockets are adapted to receive the end of a turning pin by means of which the shafts may be given a partial rotation. Opening into each socket is a lateral passage 23, said passage being substantially equal in width to the bottom of the sockets, whereby slight shoulders 24 are formed at the upper ends of said sockets to serve as a holding means to retain the turning pin in the sockets. The lateral passages 23 are slightly wider than the thickness of the turning pin, so that said pin may be released from the sockets by moving it outwardly through said passages.

In attaching my apparatus to an oscillating cylinder the shafts 17 are arranged in the direction of movement of the cylinder so that the movement of the cylinder in one direction will release the disk 21 from the turning pin, said pin moving from the sockets 22 through the passages 23 as the cylinder swings away from the operator. By this means the packing gland may be adjusted without stopping the engine or pump and by simply inserting a turning pin in a socket 22 of either disk 21 and giving the same a slight rotation in the proper direction. As the cylinder swings on its pivots away from the operator the turning pin will be released from the socket by sliding through the passage 23. This feature of my invention is considered of great value for the reason that it occasions considerable loss in pumping plants to stop the pumps for the purpose of adjusting the packing, in addition to the annoyance and inconvenience of putting the engines or pumps out of service for a length of time required to adjust the packing.

The nuts 10 are rigidly supported at their lower ends in the flange of the gland and at their upper ends in the arms 13 in the frames 11, so that the thrust of the worms against said nuts is not transferred to the stud bolts. It will also be observed that the nuts are held in firm engagement with the worms and their proper operation thus insured. The ends of the worm shafts are squared, as shown clearly in Figs. 1 and 3, in order that they may be rotated by means of a wrench or other suitable device, if found desirable.

In stuffing boxes for large piston rods and plungers the power required for adjusting the nuts to compress the packing is very great. I therefore make use of the worms and worm gears in order to secure great power and to permit of the simultaneous adjustment of all of the nuts. It would be practically impossible to adjust all of the nuts on a large packing gland without the use of some power-multiplying device, such as the worm gear shown in the drawings.

Having thus described my invention, what I claim as new and desire to secure by Letters Patent, is:—

1. The combination of a stuffing box, a gland therefor, bolts connected to the stuffing box and extending through the gland, nuts on said bolts formed with worm gears, a pair of worm shafts mounted on the gland and engaging the worm gears on the nuts, and means for driving one of said shafts from the other whereby said shafts will rotate synchronously.

2. The combination of a stuffing box, a gland therefor, a plurality of adjusting devices, a pair of shafts, means carried by said shafts to operate said adjusting devices, a disk on one of said shafts provided with inwardly tapering sockets and lateral passages communicating with said sockets and extending through one side of the disk and being arranged radially with respect to the shaft, and means whereby the shafts will be simultaneously and synchronously rotated.

3. The combination of a stuffing box, a gland therefor, adjusting devices for said gland, a shaft for operating said devices, a disk secured on said shaft and formed with an inwardly tapering substantially radial socket, an opening being formed through one side of said disk substantially equal in width to the bottom of the tapering socket and arranged radially with respect to the shaft, substantially as described and for the purpose set forth.

4. The combination of a stuffing box, a gland, a plurality of bolts extending through the gland, a nut on each of said bolts for adjusting the gland, each nut being formed with a worm gear on its exterior, rigid bearings for the ends of the nuts whereby the lateral thrust brought on the gears will be taken up by the bearings and the bolts thereby relieved of said thrust, worms in engagement with said worm gears and means for simultaneously rotating said worms.

5. The combination of a stuffing box, a gland, a plurality of bolts extending through the gland, a nut on each of said bolts for adjusting the gland, each nut being formed with a worm gear on its exterior, rigid bearings for the ends of the nuts whereby the lateral thrust brought on the gears will be taken up by the bearings and the bolts thereby relieved of said thrust, worms in engagement with said worm gears and means for rotating said worms.

6. The combination of a stuffing box, a gland, a plurality of bolts extending through the gland, a nut on each of said bolts for adjusting the gland, each nut being formed with a worm gear on its exterior, rigid bearings secured to the gland and receiving the outer ends of the nuts, the inner ends of the nuts fitting recesses formed in the outer surface of the gland, whereby the thrust on the nuts will be taken up by the rigid bearings and the gland, the bolts being thereby relieved of said strain, worms in engagement with said nuts and means for simultaneously rotating said worms.

7. The combination of a stuffing box, a gland, a plurality of bolts extending through the gland, a nut on each of said bolts for adjusting the gland, each nut being formed with a worm gear on its exterior, rigid bearing frames mounted on the gland and receiving the upper ends of the nuts, worm shafts mounted in said frames and carrying worms in engagement with the worm gears of the nuts and means for simultaneously rotating the worm shafts.

8. The combination of a stuffing box, a gland therefor formed with a flange, a plurality of bolts connected to the stuffing box and extending through the flange of the gland, a nut on each bolt, a worm gear formed on each nut, the gland being formed with recesses to receive the inner ends of the nuts, frames secured to the gland and formed with openings for worm shafts, and with inwardly extending arms having recesses to receive the outer ends of the nuts and to form bearings therefor, whereby the thrust of the worms will be taken up by the frame and the gland and will not be brought on the bolts, and a pair of worm shafts mounted in said frames and carrying worms engaging the worm gears.

In testimony whereof I hereunto affix my signature in the presence of two witnesses this 20th day of June 1908.

SAMUEL E. CONDON.

Witnesses:
WM. R. DAVIS,
E. H. KAUFMANN.